United States Patent [19]

Sullivan

[11] 4,251,985
[45] Feb. 24, 1981

[54] BLEED VALVE CONTROL CIRCUIT
[75] Inventor: Robert F. Sullivan, Indianapolis, Ind.
[73] Assignee: General Motors Corporation, Detroit, Mich.
[21] Appl. No.: 58,139
[22] Filed: Jul. 17, 1979
[51] Int. Cl.³ .............................................. F02C 9/18
[52] U.S. Cl. ..................................... 60/39.29; 415/27
[58] Field of Search ...................... 415/17, 27, 28, 47; 60/39.29

[56] References Cited
U.S. PATENT DOCUMENTS

| | | | |
|---|---|---|---|
| 2,845,938 | 8/1958 | Broders | 415/47 |
| 2,856,957 | 10/1958 | McDowall et al. | 137/528 |
| 2,933,236 | 4/1960 | Mathieson | 415/27 |
| 2,965,285 | 12/1960 | Schorn et al. | 415/17 |
| 2,978,166 | 4/1961 | Hahn | 415/27 |
| 3,016,702 | 1/1962 | Ladd | 60/39.29 |
| 3,073,511 | 1/1963 | Knight et al. | 415/27 |

Primary Examiner—Louis J. Casaregola
Attorney, Agent, or Firm—J. C. Evans

[57] ABSTRACT

A gas turbine engine control for regulating bleed from a compressor which has an engine performance map that is compressor stall stable when the ambient inlet air temperature of the engine exceeds a predetermined level and including a compressor bleed valve having a servo controlled pressure diaphragm operated poppet valve therein that is operative to bleed valve from the compressor in accordance with compressor discharge pressure conditions to extend the stall limits of operation of the compressor during engine start and low power or ground idle operation and wherein the bleed valve is associated with a thermally responsive solenoid valve controlled by a thermal switch responsive to ambient inlet air and supported on the inlet of the compressor at a point beyond the influence of engine generated heat for imposing an override pressure on the bleed valve to hold it in a closed position to prevent engine compressor bleed thereby to avoid engine power depreciation at ambient inlet air temperatures above the predetermined level.

3 Claims, 3 Drawing Figures

BLEED VALVE CONTROL CIRCUIT

This invention relates to gas turbine engine bleed valve control systems and more particularly to gas turbine engines having a poppet type bleed valve system for discharging pressure from the engine compressor in response to compressor discharge pressure ratio to extend the performance range of the engine.

Turbojet gas turbine engines with anti-stall systems include a compressor bleed valve that is operative during engine operation to bleed air from the compressor discharge to unload the compressor in accordance with the pressure level therein during starting and low power operation so as to extend the operating range of the engine by operating as close to stall region of the compressor as possible.

It has been observed that such engines can have an engine performance map that is stall stable or has greater stall stability when the engine is operated at start and low power operation under ambient temperature conditions that exceed a predetermined level. For example, a model 250 C28 Series III gas turbine engine manufactured by Detroit Diesel Allison Division of General Motors Corporation has such operating characteristics at ambient temperatures over 70° F. (21° C.). While the bleed valve in such systems is responsive to compressor discharge pressure ratio to bleed air from the engine in order to prevent engine stall, it has been observed that opening of the bleed valve at inlet air temperature ranges in the order of 98.6° F. (37° C.) and under maximum cruise power conditions can cause an undesirable engine power depreciation because of air loss from the engine. While such systems assure stall stability, total output power of the engine can be reduced during operation at higher ambient inlet air temperatures.

Accordingly, an object of the present invention is to provide an improved bleed air control system in association with a gas turbine engine having an engine performance map that is surge stable when ambient inlet air temperatures exceed a predetermined level and wherein the compressor of the engine is associated with compressor bleed valve means including a servo controlled pressure diaphragm operated poppet valve that selectively controls outboard bleed of compressor discharge air in accordance with its compressor discharge pressure ratio so as to extend the operating range of the gas turbine engine as close to the stall region of the compressor as possible by the provision of means that impose an override pressure on the bleed valve means to condition the poppet valve to be held in a closed position and wherein the last mentioned means includes a thermal switch supported on the engine at a point outside of the influence of engine generated heat so as to be operative in response to a predetermined ambient inlet air temperature to override the pressure control of the poppet valve to condition it closed thereby to maintain the bleed valve means closed at temperatures in excess of a predetermined compressor inlet air ambient temperature under maximum power cruise conditions thereby to enhance the engine power characteristics and to avoid engine power depreciation due to excessive exhaust of compressed air from the engine flow path.

Still another object of the present invention is to provide an improved anti-stall compressor air bleed control system for a turbojet engine for use in helicopters including a power turbine driven compressor that has a performance map that enables the engine to be operated above the stall region when the engine operates in an ambient temperature range above a predetermined level by the provision of a thermal switch located on the engine inlet out of the influence of engine generated heat and responsive solely to ambient compressor inlet air temperature and associated with override means operative above a predetermined temperature level of ambient inlet air temperature to condition a bleed valve with a servo-controlled pressure diaphragm operated poppet valve that normally extends the range of compressor operation of a gas turbine engine as close as possible to the stall region of the compressor and wherein the override means imposes an override pressure on the bleed valve to condition the poppet valve closed, thereby to maintain the bleed valve closed when the ambient inlet air temperature is in excess of a predetermined ambient temperature condition so as to prevent excessive engine power depreciation due to exhaust of compressed air from the engine at elevated temperatures of operation thereof and during the higher power operating modes of the engine.

Further objects and advantages of the present invention will be apparent from the following description, reference being had to the accompanying drawings wherein a preferred embodiment of the present invention is clearly shown.

Figure 1:
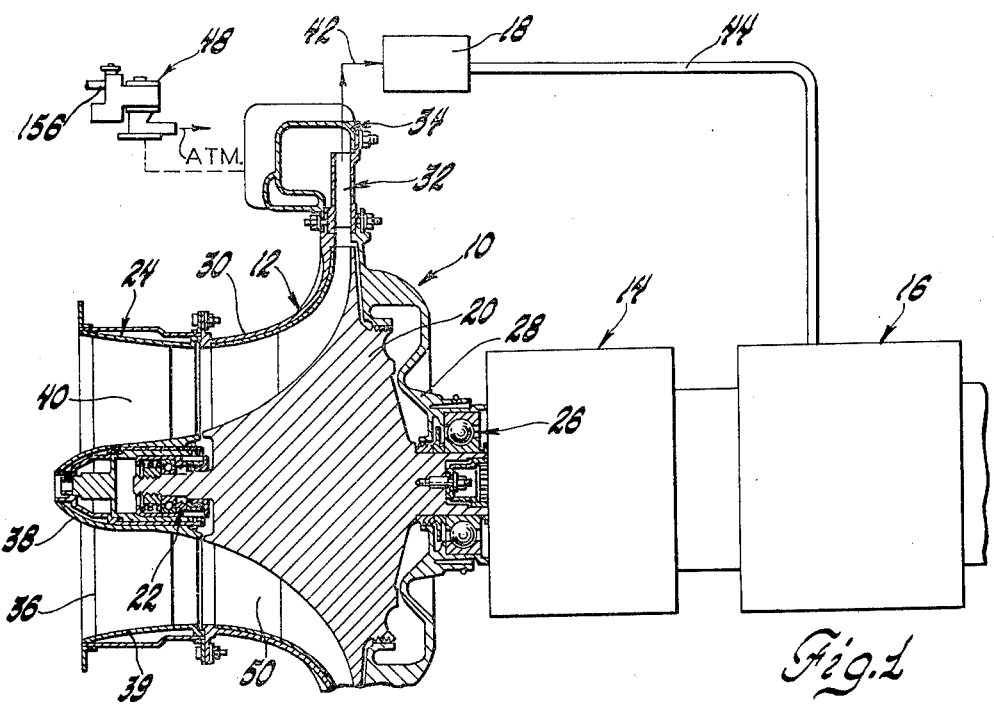
FIG. 1 is a diagrammatic view of a turbojet engine including the improved anti-stall and power range extending control system of the present invention.

In FIG. 1, a diagrammatically illustrated helicopter engine 10 is shown. It includes a compressor section 12 and a gear box assembly 14 which interconnects the compressor section 12 to a power turbine 16 having motive fluid supplied thereto from a combustor assembly 18.

The compressor section 12 is an interchangeable modular unit, cantilever-mounted on the front of the power and gear box assembly 14. The major compressor components include a single stage, centrifugal rotor 20 straddle-mounted between an inlet ball bearing assembly 22 supported by a front support unit 24 and an aft ball bearing assembly 26 supported by a rear support plate 28. An annular housing 30 constitutes the outer shroud for the centrifugal rotor 20 and defines an inlet thereto and a radial outlet leading to a vaned diffuser assembly 32. A scroll assembly 34 receives compressor discharge air downstream from the vaned diffuser 32.

The front support unit 24 includes a plurality of circumferentially spaced axial struts 36 connected to an inlet hub 38 and an outer annular inlet wall 39 to define a plurality of circumferentially located flow paths 40 to the axially arranged inlet of the shroud forming annular housing 30.

Compressed air from the scroll assembly 34 is directed through a suitable compressor discharge conduit system 42 for supplying combustion air to the combustor assembly 18 which includes a suitable fuel supply and nozzle system and igniter for burning air and fuel and producing combustion products for passage through a transition conduit 44 to the power turbine 16.

Power turbine 16 includes an inlet nozzle and turbine wheels that are coupled through the power and accessory gear box assembly 14 both powering a driven load and to operate the compressor section 12 during gas turbine engine operation.

A scroll wall segment 46 supports a bleed valve 48 directly over an outlet opening 49 in the scroll 34. Bleed valve 48 is responsive to predetermined pressure ratios between compressor discharge pressure of the compressor section 12 and atmospheric pressure. Such a bleed valve is included since the rotor 20 has blades 50 which are airfoils. If the angle of attack becomes too great, or if the velocity of air flowing over an airfoil is too low, air flow separation occurs and the airfoil stalls. This results in a loss in efficiency, a loss in pressure ratio and, therefore, a reduction in pressure level at the compressor outlet. In order to produce engines with superior fuel consumption and rapid acceleration characteristics, it is necessary to operate as close to the stall region as possible.

The ability of the compressor to pump air is a function of RPM. At low RPM speeds, the compressor does not have the same ability to pump air as it does at higher RPM speeds. In order to keep the angle of attack and air velocity within desired limits, it is necessary to "unload" the compressor in some manner during starting and low power operation. This is to say that it is necessary to make the compressor "see" less restriction to the flow of air through the use of a compressor bleed air system.

Thus, bleed valve 48 is normally opened during engine start so as to bypass air from the compressor section 12 through an exhaust port 51 in the bleed valve 48 leading to atmosphere. The bleed valve 48 further is normally opened during low engine power operations such as ground idle operation.

Such communication by the bleed valve 48 of the scroll assembly 34 with atmosphere enables the engine to operate without stall. At higher operating speeds, the centrifugal rotor is operated away from the stall line.

The centrifugal rotor 20, at higher RPM speeds, has a substantially surge-free operation. Moreover, at lower RPM speeds and at inlet compressor air temperatures above a predetermined ambient condition of operation the compressor section 12 is characterized as being relatively stall-stable, especially at temperature conditions in excess of engine ambient temperature conditions above 70° F. (20° C.).

Accordingly, the present invention includes means to prevent compressor bleed valve discharge flow where the engine has demonstrated surge-free operating characteristics under warm compressor inlet air ambient temperature ranges of operation.

Figure 2:
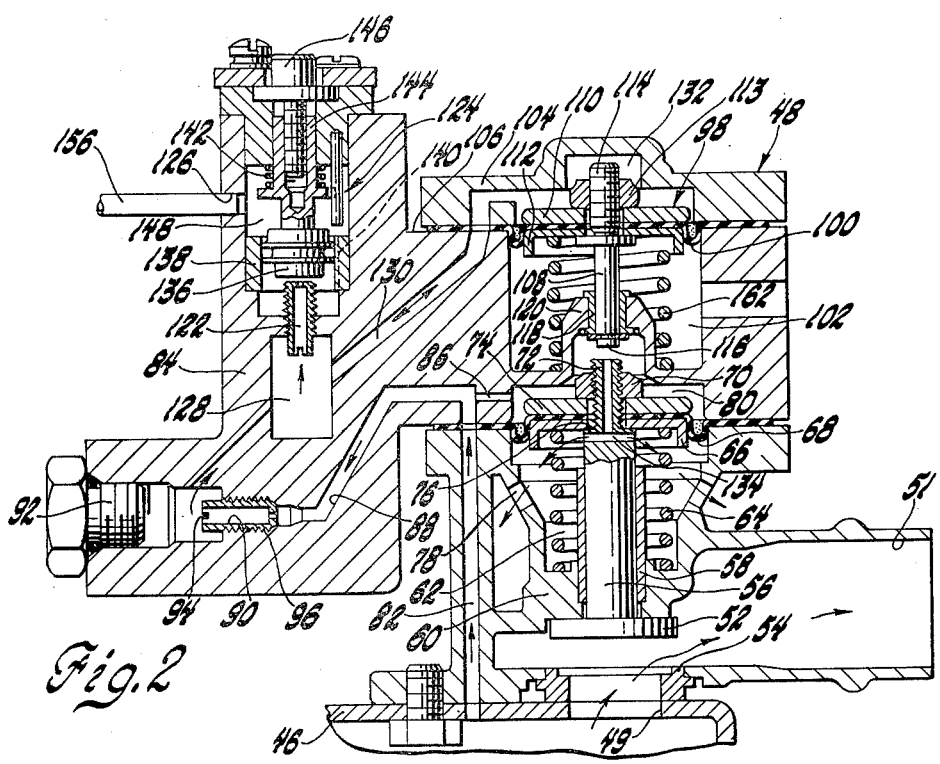
FIG. 2 is a sectional view, with components therein partially shown in elevation of a bleed control valve modified in accordance with the present invention.
Figure 3:
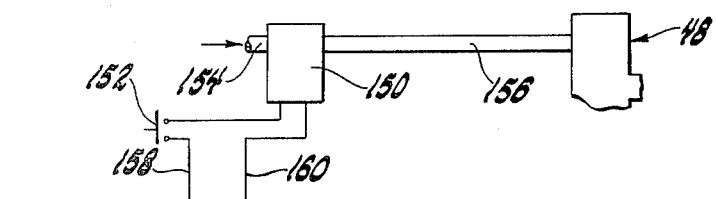
FIG. 3 is a diagrammatic showing of a control circuit used in association with the component parts of the present invention.

Referring more specifically to FIG. 2, the bleed valve 48 includes a poppet valve component 52 that is movable with respect to valve seat 54 to open and close communication between the scroll opening 49 and atmosphere through the exhaust port 51 of the bleed valve 48. The poppet valve 52 has an upstanding stem 56 slidably supported by a bushing 58 supported in a valve housing wall 60 that defines a vented piston chamber 62 therein in which is received a poppet valve spring 64 having one end thereof seated against the wall 60 and the opposite end thereof seated against a retainer plate 66 held against one side of a diaphragm 68 by a nut 70 threadably received on an externally threaded stem extension 72 and in engagement with the outboard face of a connector plate 74 which presses the diaphragm 68 against the retainer plate 66 which is held against an index shoulder 76 on the stem 56.

The underside of diaphragm 68 is exposed to atmosphere through a plurality of vent holes 78 in the housing wall 60. The opposite side of the diaphragm 66 is in communication with a servo air pressure chamber 80 that is in communication with a flow passage 82 that is connected to compressor discharge pressure, $P_C$, from the scroll assembly 34.

More particularly, the passage 82 is a drilled hole that extends into the intermediate body 84 of the bleed valve 48 where a branch line 86 supplies pressure to the chamber 80 and a passage 88 directs compressor discharge pressure to a control orifice 90 that is removably located within the intermediate body 84. A plug unit 92 on body 84 provides access to orifice 90. The control orifice 90 includes a slotted head 94 and an externally threaded body 96 thereon so as to be threadably removable from the intermediate body 84 and sized to select a predetermined pressure ratio of compressor discharge pressure and atmospheric pressure at which the poppet valve 52 will open and close.

In the illustrated arrangement a control servo valve 98 is located within the intermediate body 84. It includes a diaphragm 100 exposed to an atmospheric cavity 102 in the intermediate body 84 of the bleed valve 48. The diaphragm 100 is held in place by a cover 104 so as to be sealed at its periphery against the outer surface 106 of the intermediate body 84. The diaphragm 100 further is secured to a modulating valve stem 108 by a pair of plates 110, 112 on either side of the diaphragm 100 and is secured thereagainst by a nut 113 connected to the threaded outer end 114 of the modulating valve stem 108.

The stem 108 includes a valve element 116 on one end thereof which is slidably reciprocated with respect to a guide bushing 118 held by an inverted raised cup 120 forming an impervious wall portion between the atmospheric cavity 102 and the control chamber 80 within the intermediate body 84.

A control pressure ratio across diaphragm 100 is established in part by a pressure regulating orifice 122 in body 84 which is in series connection with an evacuated bellows assembly 124 that bleeds a predetermined amount of air through a side port 126 of the bleed valve 48 to atmosphere to establish a regulated pressure in regulated pressure chamber 128 within the intermediate body 84. The regulated pressure $P_R$ passes through a passage 130 that communicates with a regulated pressure chamber 132 formed in the cover 104. The regulated pressure will act on the diaphragm 100 and will cause the modulating valve stem 108 to move to close the valve 116 against the upper end of the stem 72 which has a poppet valve stem orifice 134 therethrough in communication with atmospheric pressure.

The evacuated bellows assemblies include a bellows unit 136 whose length varies inversely with air pressure, thus effectively decreasing the flow through orifice 122 at higher altitudes. It slides in a sleeve 138 with a plurality of fingers 140 which decrease the harmful effects of vibration. A damper spring 142 surrounds a guide stem 144 which is adjusted by a calibrating screw 146.

During engine operation, compressor discharge pressure, $P_C$, is directed from the scroll 34 through passage 82 to the servo chamber 80 where servo air pressure, $P_X$, is established, and through the restricted control orifice 90 to the pressure regulated chamber 128 where regulated air pressure, $P_R$, is maintained. Servo air pressure chamber 80 has the air therein vented to atmosphere, $P_A$, or ambient air pressure, through restricted passages 134 in the poppet valve stem 56. The regulated pressure chamber 128 is vented to ambient air pressure through an orifice or restrictor 122 of the jet type as modulated by evacuated bellows 136 through a bellows chamber 148 which is in communication with the port 126. The rate of air flow from passage 82 to chamber 128 and through port 126 via the bellows chamber 148 determines the level of the regulated pressure in the chamber 132 for any given pressure ratio and therefore compressor section rpm. The regulated pressure in turn determines the position of the control servo valve 98. The position of the control servo valve controls the position of valve 52 since the pressure in chamber 80 will self regulate to just balance the external forces and in so doing will keep valve 52 just a few thousandths of an inch away from valve 116.

Operation of the bleed valve 48 thereby is a function of preselected ratios of the compressor discharge pressure, $P_C$, to atmospheric pressure across the area defined by the poppet valve seat opening area and the ratio of $P_C$ to $P_R$ to $P_A$ as established during the operation of the bleed valve 48. When the $P_X$ pressure is less than $P_C$ plus the spring force of spring 64, the poppet valve 52 is opened. When the $P_X$ pressure is greater than $P_C$ plus the force of spring 64, the poppet valve 52 is closed. The area of the diaphragm 68 at the servo air pressure chamber 80 is greater than that of the poppet valve seat, thus the compressor discharge pressure can be used as the closing force. The pressure in the chamber 80 is regulated by the servo valve 98 to establish its relative position to the poppet valve stem vent passages 134 which lead to atmosphere.

The movement of stem 108 of the servo valve 98 is a function of $P_R$ pressure. $P_C$ pressure is directed into the $P_R$ chamber through the fixed orifice 96 and exits to atmosphere through a variable opening which is established by movement of the expandable evacuated bellows 136 with respect to the slots 140 in the sleeve 138. The evacuated bellows 136 is operated to determine the amount of air flow through the outlet port 126. As previously stated, the length of the evacuated bellows 136 is a function of atmospheric air density. Thus, the air flowing through the exit port 126 is less at higher altitudes than it would be at sea level.

In accordance with the above procedures, as the air compressor rotor 20 increases in speed ($N_1$), $P_C$ pressure increases and $P_R$ pressure increases. As $P_R$ pressure increases, the servo valve diaphragm 100 and stem 108 attached thereto will start to move to position the valve 116 closer to the upper end of the poppet valve stem 56 to restrict flow of air through the passages 134 therein. Restriction of flow of air out of the chamber 80 occurs via the poppet valve stem passages 134 in accordance with the position of the servo stem 108 with respect thereto. Thus, the poppet valve 52 will move toward the closed position and the servo valve 98 and the poppet valve 52 are moved in direct relationship with each other. The only time the servo valve 98 will make contact with the poppet valve stem 56 to completely block air flow from the chamber 80 will be when the poppet valve 52 is completely closed.

In accordance with the present invention, the $P_A$ exit port 126 at the bellows chamber 148 is connected to a bleed control solenoid valve 150. This valve is electrically actuated by a thermal switch 152 mounted at the compressor inlet. When the solenoid valve 150 is actuated, it will cause the bleed valve port 126 to close thereby blocking the $P_R$ pressure venting function set forth above. This increases the pressure in the chamber 80 to hold the poppet valve 52 closed when the thermal switch senses the predetermined compressor inlet air ambient temperature of over 70° F.

Thus, the basic valve function is to maintain the poppet valve 52 open under start and ground idle conditions of operation. Under such conditions, the ratio of the regulated pressure in the system which is present in the chamber 132 is less than that which is required to move the modulating servo valve stem 108 into its flow restricting position with passage 134 in stem 56. Accordingly, the pressure in chamber 80 is continually bled through the passage 134 to atmosphere and the force of poppet spring 64 holds the poppet valve open. In other operating conditions of the compressor, the pressure ratio established by the regulated pressure within the chamber 132 will close the modulating servo valve and as a result there will be a pressure build up within the cavity 80 to build up the pressure on the diaphragm 68 until the force of spring 64 is overcome, thereby to cause the poppet valve 52 to begin to modulate.

There are certain operating conditions, however, where it is desirable to maintain the poppet valve closed at all times. One such condition occurs when the ambient temperature condition of the engine operation is above a temperature level at which the engine, because of its operating conditions, will have a stable stall-free range of compressor operation. Moreover, another characteristic of the engine is that when it is operated under maximum cruise power conditions of operation, it is better not to have the valve 52 modulating as it would under normal bleed valve operation.

In the past, when such an engine was operated at a maximum cruise power of operation, such modulation valve systems produced an engine power depreciation because of excessive exhaust of compressed air from the system.

In accordance with the present invention, means are provided to pressure load the bleed valve assembly 48 so as to condition it to be maintained completely closed above inlet air ambient temperatures of operation above which the engine, during its ranges of engine operation, will be compressor stall stable and will not be power deficient.

To effect such an improved operation, the bleed valve 48 is associated with the solenoid controlled valve 150 which has an inlet 154 in communication with atmosphere in an outlet connected by a conduit 156 to the side port 126 that is located on the discharge side of the pressure regulating evacuated bellows 136. The valve 150 is normally open so that the pressure regulating bellows assembly will maintain a desired pressure range within the regulated pressure chamber 128 to effect its modulating control. However, in the present invention, the thermally responsive switch 152 is located in the vicinity of the inlet bell defined by front support unit 24 at a point removed from the output temperature of the engine 10 during its operation and thereby to be sensitive only to temperature of the ambient inlet air to 70° F. When the inlet air conditions are above 68° F. to 70° F. the engine 10, as stated above, has substantially compressor stall free operation throughout the ranges of engine operation. Accordingly, at this point the function of the bleed valve 48 in modulating bleed flow through exhaust port 51 is overridden. To accomplish this objective, the solenoid valve 150 is conditioned closed by the thermal switch 152 which completes an energization circuit from a power source represented by the lines 158, 160 to the solenoid operated valve 150. When it is closed, the pressure at the evacuated bellows 136 and sleeve 138 will increase to a point where the regulated pressure within the chamber 128 will substantially correspond to the compressor discharge pressure through the passage 82. At this point, the pressure build up within the control servo chamber 132 will collapse a control servo spring 162 to cause the valve 116 to remain closed against the stem 56 to close passage 134 therethrough. At the same time, the pressure build-up within the chamber 80 will increase to a point to overcome the force of the spring 64, thereby to bias the poppet valve 52 closed and to maintain it closed during operation of the engine at inlet temperatures in excess of 68° F. As a result, there is no modulated bleed of air from the engine during this phase of operation and the engine, accordingly, operates under maximum power phases of operation without any loss of power or power depreciation.

While the embodiments of the present invention, as herein disclosed, constitute a preferred form, it is to be understood that other forms might be adopted.

The embodiments of the invention in which an exclusive property or privilege is claimed are defined as follows:

1. In a gas turbine engine the combination of: means including a compressor, a turbine engine air inlet for directing inlet air into said compressor, and a combustion products driven turbine wheel for producing an engine performance map that is stall stable when ambient inlet air temperature to the compressor exceeds a predetermined temperature, compressor bleed valve means for selectively controlling outboard bleed of compressor air in response to compressor discharge pressure conditions and operative to dump air from the compressor for extending its stall limit range of operation under engine start and low load operations, and means including a thermal switch only responsive to air temperatures at the inlet above the predetermined temperature for imposing an override pressure on said bleed valve means to fully override its response to compressor discharge pressure to condition said bleed valve means to be closed when ambient inlet air temperatures to the compressor are greater than the predetermined temperature level of stall stable compressor operation and irrespective of compressor discharge pressure variation thereby to prevent bleed valve means opening at engine start and maximum cruise power condition when temperatures are in excess of the predetermined inlet air ambient temperature condition.

2. In a gas turbine engine, the combination of means including a compressor and a combustion products driven turbine wheel having an engine performance map that is compressor stall stable when compressor inlet air ambient temperature exceeds a predetermined level, a turbine engine inlet for directing inlet air into said compressor, compressor bleed valve means including a servo controlled, compressor discharge pressure operated poppet valve therein for selectively controlling outboard bleed of compressor air in response to compressor discharge pressure conditions and operative to bleed air from the compressor for extending the stall limits of operation of the gas turbine engine compressor, and thermally responsive means including a solenoid operated control valve only responsive to inlet air temperatures above the predetermined temperature for imposing an override pressure on said bleed valve means to fully override its response to compressor discharge pressure to condition said poppet valve to be held in a closed position, said thermally responsive means including a thermal electric switch means supported on said inlet at a point uninfluenced by engine generated heat and operative only in response to ambient inlet air temperatures to the compressor greater than the predetermined temperature level of stall stable compressor operation to condition said solenoid operated control valve to impose an override pressure on said bleed valve means to condition it to maintain said poppet valve closed thereby to prevent poppet valve opening at temperatures in excess of the predetermined compressor inlet air ambient temperature condition under maximum cruise power conditions to avoid engine power depreciation due to outboard bleed of compressed air from the engine.

3. In a gas turbine engine the combination of means including a compressor and a combustion products driven turbine wheel having an engine performance map that is compressor stall stable when compressor inlet air ambient temperature exceeds a predetermined level, a turbine engine inlet for directing inlet air into said compressor, a compressor discharge scroll, compressor bleed valve means on said scroll, a servo controlled, pressure diaphragm operated poppet valve in said bleed valve means therein for selectively controlling outboard bleed of compressor air from said compressor discharge scroll in response to compressor discharge pressure conditions therein and operative to bleed air from the compressor discharge scroll for extending the stall limit range of operation of the gas turbine engine, and thermally responsive means including a solenoid operated control valve only responsive to inlet air temperature above the predetermined temperature for imposing an override pressure on said bleed valve means to fully override its response to compressor discharge pressure to condition said poppet valve to be held in a closed position, said thermally responsive means including a thermal electric switch means supported on said inlet at a point uninfluenced by engine generated heat and operative only in response to ambient inlet air temperatures to the compressor greater than the predetermined temperature level of surge stable engine operation to condition said solenoid operated control valve to impose an override pressure on said bleed valve means to condition it to maintain said poppet valve closed thereby to prevent bleed valve means opening at temperatures in excess of the predetermined compressor inlet air ambient temperature condition under maximum cruise power conditions to avoid engine power depreciation due to outboard bleed of compressed air from the engine.

* * * * *